United States Patent [19]

Miyauchi et al.

[11] Patent Number: 5,033,771
[45] Date of Patent: Jul. 23, 1991

[54] AIRBAG RESTRAINT SYSTEM

[75] Inventors: Fumio Miyauchi; Shinji Hamada, both of Kanagawa Prefecture, Japan

[73] Assignee: Ikeda Bussan Co., Ltd., Ayase, Japan

[21] Appl. No.: 615,059

[22] Filed: Nov. 19, 1990

[30] Foreign Application Priority Data

Nov. 22, 1989 [JP] Japan .................................. 1-304070
Feb. 28, 1990 [JP] Japan .................................... 2-45633

[51] Int. Cl.⁵ ............................................. B60R 21/16
[52] U.S. Cl. .................................... 280/728; 280/730; 280/743
[58] Field of Search ................. 280/728, 729, 730, 743

[56] References Cited

U.S. PATENT DOCUMENTS 4,213,634 7/1980 Hoshino et al. ..................... 280/728
4,887,842 12/1989 Sato ................................... 280/730

FOREIGN PATENT DOCUMENTS 56-43890 10/1981 Japan .
61-185642 11/1986 Japan .
2229680 10/1990 United Kingdom ............... 280/728

Primary Examiner—Charles A. Marmor
Assistant Examiner—Michael Shaughnessy
Attorney, Agent, or Firm—Foley & Lardner

[57] ABSTRACT

An airbag restraint system for protecting a vehicle passenger in the event of a serious vehicle collision. The airbag is comprised of an airbag which is adapted to inflate upon being supplied with gas from a gas generator. The airbag includes a bag-shaped section which has generally circular rear and front side sheet members which are joined together at their peripheral portions to define a gas chamber to be filled with the gas from the gas generator. A plurality of suspension belts are disposed inside the bag-shaped section. One end of each suspension belt is sewed to a belt catch member which is in turn sewed to the central part of the rear side sheet member, thereby forming a sewed section. The sewed section extends linearly and includes a straightly extending portion which is generally perpendicular to a lenghwise direction of each suspension belt.

10 Claims, 5 Drawing Sheets

AIRBAG RESTRAINT SYSTEM

BACKGROUND OF THE INVENTION

1. Field of the Invention

This invention relates to improvements in an airbag restraint system for protecting a passenger in a vehicle which has been in a serious collision or the like, and more particularly to an airbag which is provided therein with suspension belts to prevent the airbag from inflating generally in one direction upon being supplied with gas from a gas generator.

2. Description of the Prior Art

Hitherto, a variety of airbag restraint systems for automotive vehicles have been proposed and put into practical use in order to protect a vehicle passenger in the event of a serious vehicle collision or the like. Such airbag restraint systems are disclosed, for example, in Japanese Patent Publication No. 56-43890 and Japanese Utility Model Provisional Publication No. 61-185642.

The airbag restraint systems have usually been arranged as set forth below. The airbag restraint system includes an airbag which is momentarily inflated upon being filled with gas from a gas generator in the event of a serious vehicle collision or the like. The airbag has front and rear side sheet members which are formed of cloth material. The front and rear side sheet members are sewed at their peripheral portions to each other forming a bag-shape. The rear side sheet member is formed at its central part with a gas inlet through which the gas from the gas generator is supplied into the airbag.

Additionally, the airbag is provided therein with a plurality of suspension belts for the purpose of preventing the airbag from inflating to project generally in one direction or toward the vehicle passenger during inflation of the airbag upon being supplied with the gas. Each suspension belt is sewed at one end section to the inner surface of the front side sheet member. The other end section of the suspension belt is put between and sewed to a pair of belt catch members. The end sections of the belt catch members are in turn sewed to the rear side sheet member, at a location near the gas inlet, forming a circular sewed section in which the lines of the sewing threads extend in a generally circular pattern.

However, difficulties have been encountered in such a conventional airbag restraint system, as discussed hereinafter with reference to FIG. 9 of the drawings of the present application. When the airbag inflates under the pressure of the gas, a high tension is applied along the length of the suspension belts 2 the airbag through the end section 2a of the belts 2. At this time, the high tension unavoidably concentrates to a local point N at which the extension of the longitudinal axis of the suspension belt 2 crosses the circular sewed section 4 through which the belt catch members 6 are joined with the rear side sheet member 3. Therefore, there is a possibility that the sewing threads 5, at the point N, may break so that the belt catch members 6 are no longer joined to the rear side sheet member 3 of the airbag.

SUMMARY OF THE INVENTION

An object of the present invention is to provide an improved airbag restraint system which is excellent from a strength and safety view point, while overcoming the drawbacks of conventional airbag restraint systems.

Another object of the present invention is to provide an improved airbag restraint system having an airbag provided thereinside with suspension belts, in which sewing threads for joining the suspension belts with the inner surface of the airbag can be effectively prevented from breakage thereby avoiding the separation of the suspension belts from the airbag.

An airbag restraint system of the present invention is comprised of an airbag which is fluidly connected with a gas generator and adapted to be supplied with gas from the gas generator. The airbag includes a bag-shaped section including a rear side sheet member formed with a central opening through which gas is supplied from the gas generator, and a front side sheet member joined with the rear side sheet member at an outer peripheral portion to define a gas chamber which is filled with the gas from the gas generator. A plurality of suspension belts are disposed inside the bag-shaped section to connect the rear and front side sheet members at their inner surfaces. A belt catch member is disposed inside the bag-shaped section in such a manner that one end section of each suspension belt is sewed to the belt catch member. Additionally, the belt catch member is sewed to one of rear and front side sheet members at the inner surface, forming a sewed section. The sewed section extends linearly and includes a straightly extending portion which is generally perpendicular to a lengthwise direction of each suspension belt.

Accordingly, by virtue of the feature that the straightly extending portion of the sewed section is generally perpendicular to the lengthwise direction of each suspension belt, a high tension applied to each suspension belt is uniformly distributed throughout the length of the straightly extending portion of the sewed section thereby preventing the high tension from acting on a local point of the sewed section. This prevents sewing threads in the sewing section from being broken. Accordingly, there is no possibility that the belt catch member is separated from the inner surface of the bag-shaped section, thus preventing the airbag from inflating toward a vehicle passenger.

BRIEF DESCRIPTION OF THE DRAWINGS

In the drawings, the same reference numerals designate the same elements and parts throughout all the figures, in which.

DETAILED DESCRIPTION OF THE INVENTION

Figure 1:
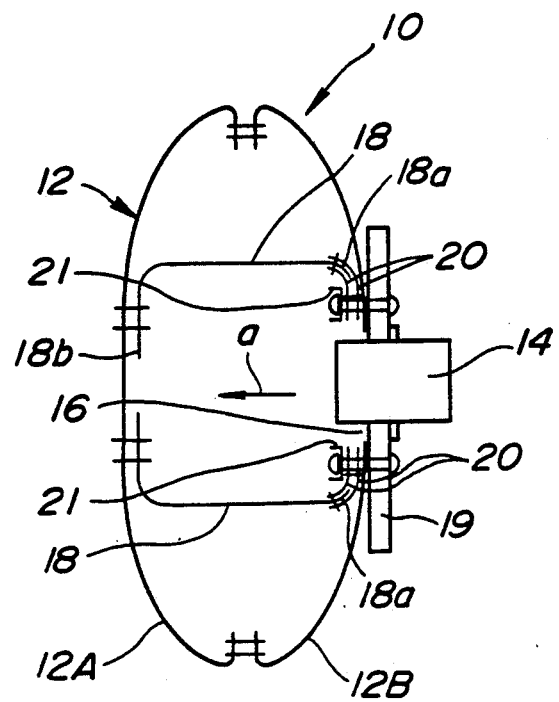
FIG. 1 is a schematic sectional view of an airbag of an embodiment of an airbag restraint system in accordance with the present invention.
Figure 2:
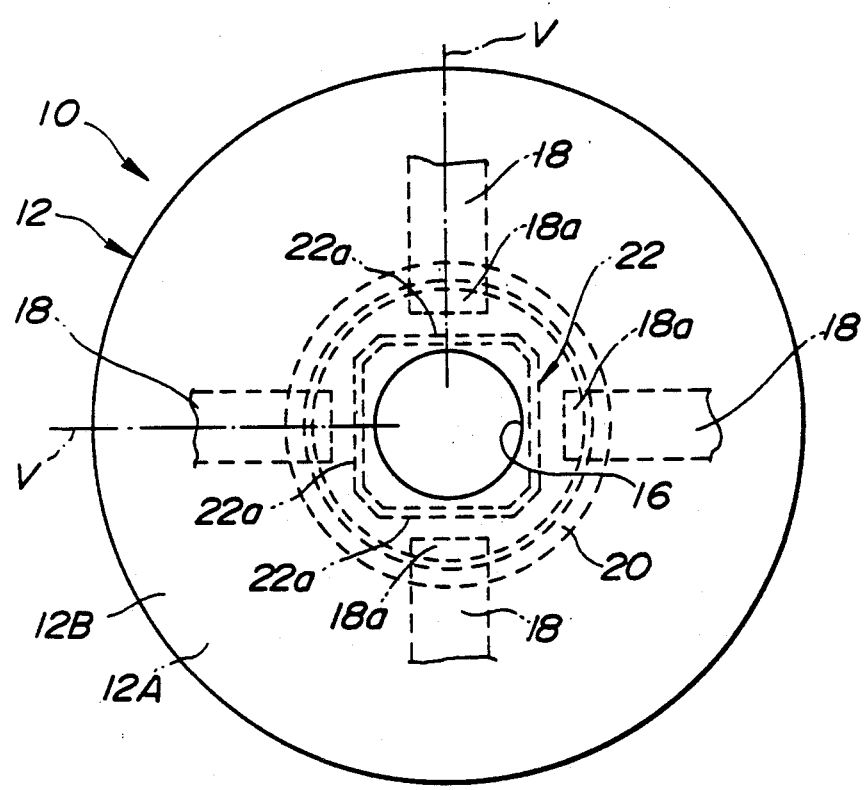
FIG. 2 is a rear elevation of the airbag of FIG. 1.

Referring now to FIGS. 1 and 2, there is shown an embodiment of an airbag restraint system in accordance with the present invention. The airbag restraint system of this embodiment is for an automotive vehicle and comprises an airbag 10. The airbag 10 is designed to momentarily inflate in the event of a serious vehicle collision in order to provide a soft cushion for a vehicle passenger. The inflation of the airbag 10 is carried out when the airbag 10 is supplied with gas generated by a gas generator 14. The gas generator 14 is arranged to generate gas to be supplied into the airbag 10 at a predetermined condition or during a serious collision.

The airbag 10 includes a bag-shaped section 12 which is constituted of front and rear side sheets or cloth members 12A, 12B which are generally circular, in which the outer peripheral portions of the front and rear side sheet members 12A, 12B are sewed to each other to form a bag shape. The rear side sheet member 12B is formed at its central part with a central opening 16 serving as a gas inlet through which the gas from the gas generator 14 is supplied to the inside of the airbag 10.

Four suspension belts 18 are fixedly disposed inside the airbag 10 in order to prevent the airbag 10 from inflating generally in one direction or toward the passenger when under the striking force of a directional gas pressure (indicated by an arrow a in FIG. 1) of gas ejected from the gas generator 14 against the central part of the front side sheet member 12A of the airbag 10. An end section 18a of each suspension belt 18 is put between and sewed to two belt catch (sheet) members 20, 20. The belt catch members 20, 20 are sewed to the inner peripheral portion of the rear side sheet member 12B which inner peripheral portion defines thereinside the central opening 16, forming a sewed section 22 as shown in FIG. 2. The other end section 18b of each suspension belt 18 is sewed to the central part of the front side sheet member 12A.

The inner peripheral portion of the rear side sheet member 12B is fixedly secured to a base member 19 which is fixed to a stationary member such as an instrument panel or a steering wheel of the vehicle though not shown. More specifically, the rear side sheet member inner peripheral portion, together with the belt catch members 20, are put between the base plate 19 and a retainer 21 and fixed in position by means of pins (no numerals) for connecting the base plate 19 and the retainer 21. The pins pass through the belt catch members 20 and the inner peripheral portion of the rear side sheet member 12B.

As clearly shown in FIG. 2, the sewed section 22 of the belt catch member 20 with the airbag rear side sheet member 12b formed to extend generally linearly and rectangularly. In this embodiment, the sewed section 22 includes two sewing lines. In the embodiment, the corners of the rectangularly extending sewed section 22 are rounded so that the sewed section 22 is formed generally octogonal in shape. The linearly extending sewed section 22 has four straightly extending long portions 22a. The length of the straightly extending long portion 22a is larger than the width of the end section 18a of the suspension belt 18. It is to be noted that the end section 18a of each suspension belt 18 is generally perpendicular to the straightly extending long portion 22a. In other words, and more specifically, the straightly extending portion 22a of the sewed section 22 is perpendicular to an imaginary vertical plane V including a longitudinal axis of the end section 18a of the suspension belt 18.

Figure 3:
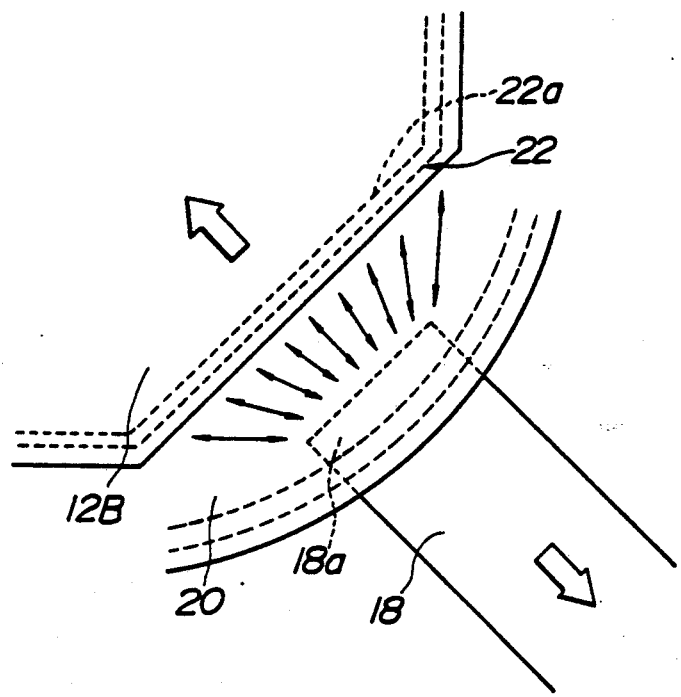
FIG. 3 is a fragmentary explanatory view illustrating effects of the airbag of FIGS. 1 and 2.
Figure 9:
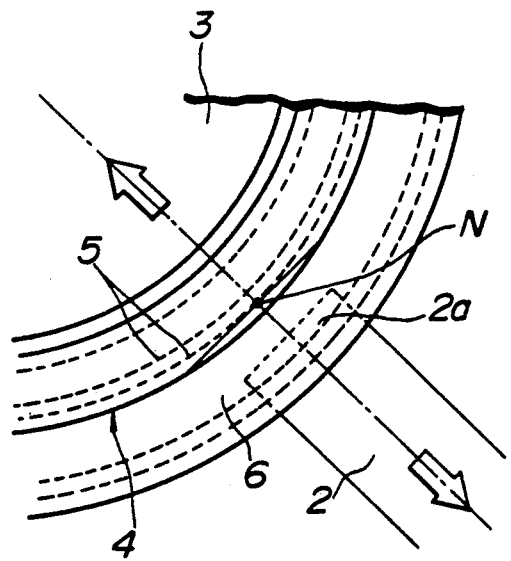
FIG. 9 is a fragmentary explanatory view illustrating a disadvantageous operation of an airbag of a conventional airbag restraint system.

With the airbag 10 arranged as described above, when the airbag 10 momentarily inflates upon being supplied with gas from the gas generator 14 at a predetermined condition during a serious vehicle collision, a high tension is applied to each of the suspension belts 18 and then transmitted through the belt catch members 20 to the sewed section 22. Thus, the tension is transmitted and distributed uniformly throughout the length of the straightly extending long portion 22a of the sewed section 22 without concentrating to a local point of the sewed section 22 as illustrated in FIG. 3. This can effectively prevent sewing threads of the sewed section 22 from being broken. As a result, the breaking strength of the sewing threads in this embodiment is improved 40 to 50% over the conventional airbag arrangement in which the sewed section is formed generally circular as is shown in FIg. 9. Accordingly, the belt catch member 20 is effectively prevented from separating from the rear side sheet member 12B of the airbag 10, thereby omitting the possibility of the airbag 10 striking 10 against the passenger. This provides an airbag restraining system which is excellent in safety.

Figure 4:
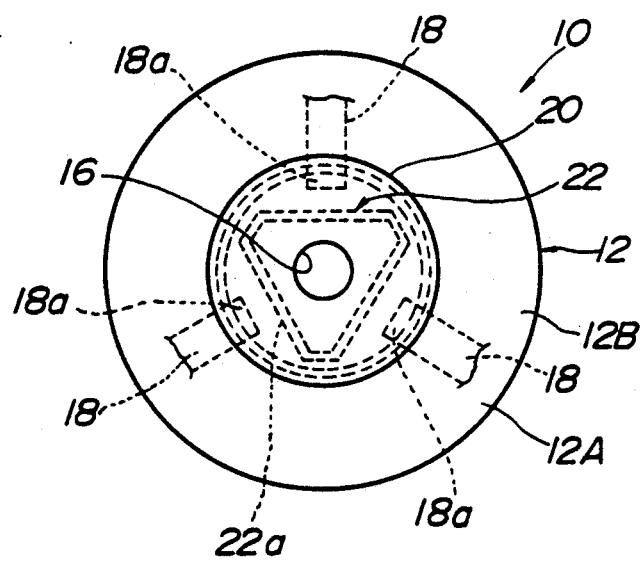
FIG. 4 is a rear elevation of another example of the airbag of the embodiment of the airbag restraint system in accordance with the present invention.

FIG. 4 illustrates another example of the airbag 10 of the embodiment of the present invention, which is similar to that in FIG. 1 and 2, with the exception that three suspension belts 18 are sued instead of four suspension belts 18. In this example, the sewed section 22 is formed to extend generally linearly and triangularly so as to form three straightly extending long portions 22a. The sewed section 22 includes two sewing lines (no numerals). The corners of the sewed section 22 is generally rounded so that the sewed section 22 is formed in a generally hexagonal shape. Also in this example, the end section 18a of each suspension belt 18 is perpendicular to the long portion 22a. More specifically, the long portion 22a is perpendicular to an imaginary vertical plane (now shown) containing the axis of the suspension belt 18 is the same as in the example of FIGs. 1 and 2.

Figure 5:
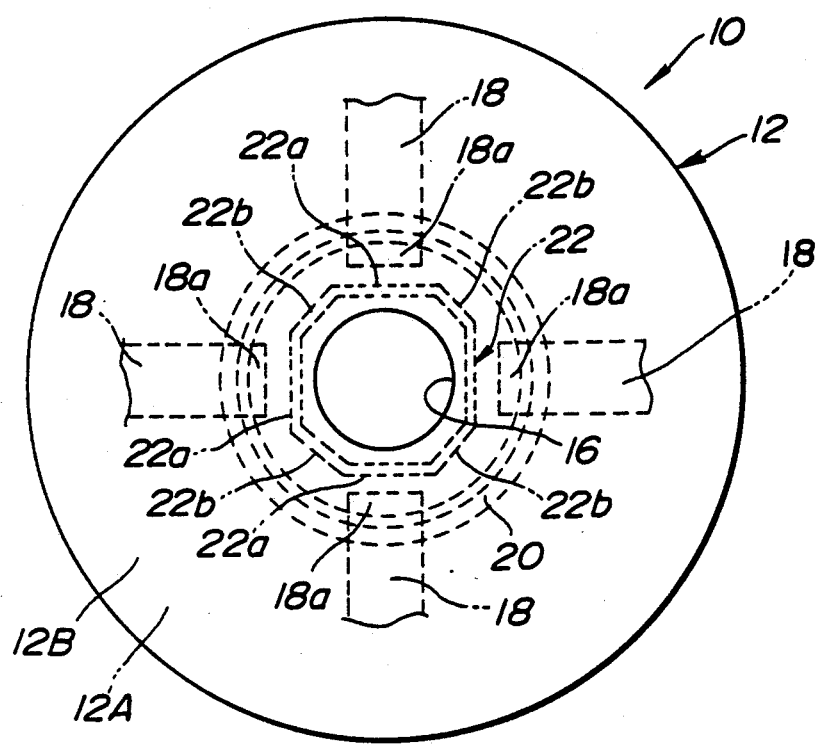
FIG. 5 is a rear elevation of a further example of the airbag of the embodiment of the airbag restraint system in accordance with the present invention.

FIG. 5 illustrates a further example of the airbag 10 of the embodiment of the present invention which is similar to that of FIGS. 1 and 2. In this example, the sewed section 22 is formed generally linear and octogonal and includes four straightly extending long portions 22a and four straightly extending short portions 22b. Each long portion 22a is perpendicular to the imaginary vertical plane (not shown) containing the longitudinal axis of the suspension belt 18. As shown, the length of the long portion 22a is longer than the width of the suspension belt end section 18a.

Figure 6:
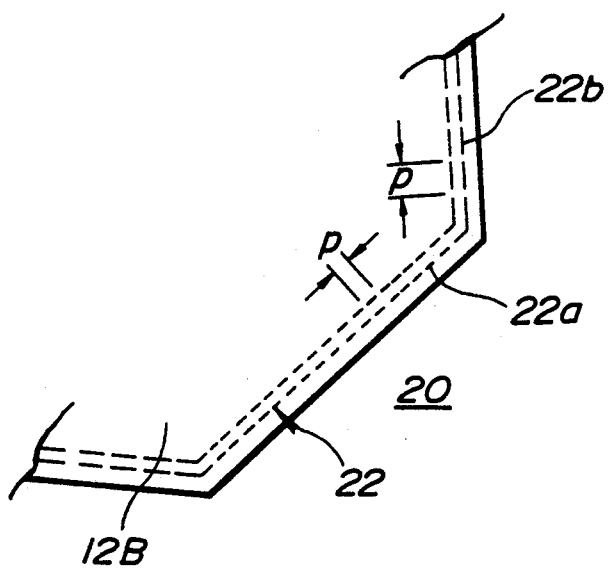
FIG. 6 is a fragmentary enlarged view of a sewed section in the airbag of FIG. 5.

In this embodiment, the sewed section long portion 22a has a sewing pitch P which is smaller than that of the sewed section short portion 22b as clearly shown in FIG. 6. The sewing pitch P of the long portion 22a is within a range from 1.5 to 3 mm, with a preferable pitch of 2 mm. The sewing pitch P of the short portion 22b is within a range from 3 to 5 mm, with a preferable pitch of 3 mm. The sewing pitch P is the distance between adjacent holes formed by a sewing needle.

Additionally, in this embodiment, the weaving directions of the front and rear side sheet (cloth) members 12A, 12B are not parallel with each other and angularly cross each other at their peripheral portions which are sewed to each other. In other words, the front and rear sheet members 12A, 12B are in a so-called biasing condition at the joined peripheral portions thereof. More specifically, the directions of the corresponding threads (for example, warp yarns) of the front and rear side sheet (cloth) members angularly cross each other at the joined peripheral portions of the first and second sheet members 12A, 12B. Furthermore, the weaving direction of the belt catch members 20 is not parallel with that of the rear side sheet member 12B and therefore crosses that of the rear side sheet member 12B at the sewed section 22 through which the belt catch members 20 and the rear side sheet member 12B are sewed to each other. In other words, the belt catch members 20 and the rear sheet member 12B are in a biasing condition at the sewed section 22.

Figure 7:
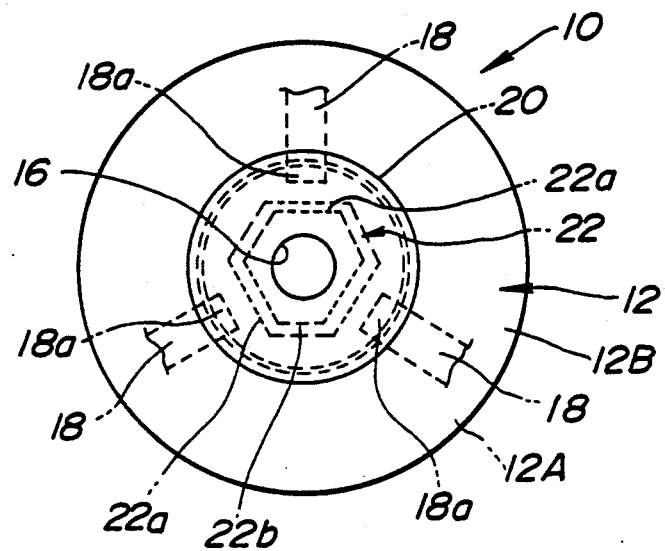
FIG. 7 is a rear elevation of a still further example of the airbag of the embodiment of the airbag restraint system in accordance with the present invention.

FIG. 7 illustrates a further example of the airbag of the embodiment of the present invention which is similar to that of FIG. 5 with the exception that three suspension belts 18 are used in place of the four suspension belts 18. In this example, the sewed section 22 is formed to extend generally hexagonally. Also in this example, the structural relationship between each suspension belt 18 and each straightly extending long portion 22a of the sewed section 22 is the same as that in the example of FIG. 5. Additionally, the relationship between the sewing pitches P of the long portion 22a and that of the short portion 22b is the same as that in the example of FIG. 5.

While three and four suspension belts 18 have been shown and described as being used in the above examples, it will be understood that the principle of the present invention may be applied to airbags having a plurality of suspension belts other than three and four.

Although the two belt catch member 20 have been shown and described as being used in a manner where the end section 18a of each suspension belt 18 is put between them in the above examples, it will be appreciated that three or more belt catch members may be used. In the regard, a patch cloth may be sewed to the rear side sheet member 12B upon which the belt catch members 20 are sewed to the rear side sheet member 12B, though not shown.

Figure 8:
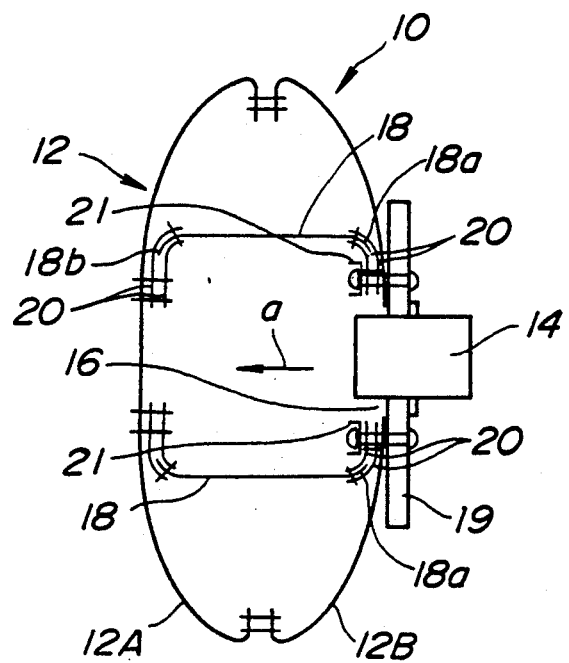
FIG. 8 is a schematic sectional view of a modified example of an airbag of the embodiment of the airbag restraint system in accordance with the present invention.

While only one structural relationship between the suspension belts 18 and the belt catch member 20 joined with the rear side sheet member 12B has been shown and described in the above embodiment, it will be appreciated that the end section 18b of each suspension belt 18 may be connected to the inner surface of the front side sheet member 12A in a manner shown in FIG. 8 in addition to the above-discussed arrangement shown in FIG. 1. In other words, in the arrangement of FIG. 8, the principle of the present invention may be applied to both end sections 18a, 18b of each suspension belt 18. As shown in FIG. 8, the end section 18b of the suspension belt 18 is put between and sewed to two belt catch members 20, 20 which are sewed to the front side sheet member 12A through the sewed section (22). Of course, the end section 18a of the suspension belt 18 is put between and sewed to the two belt catch members 20, 20 which are sewed to the rear side sheet member 12B through the sewed section 22. Additionally, the structural relationship between the sewed section (22) and the end section 18b of the suspension belt 18 is similar to that shown in FIG. 1 to 3. More specifically, the sewed section (22) includes straightly extending portions (22a) each of which is perpendicular to the lengthwise direction of each suspension belt 18, though this is not shown in FIG. 8.

What is claimed is:

1. An airbag restraint system comprising:
   an airbag fluidly connected with a gas generator and adapted to be supplied with gas from the gas generator, said airbag including
      a bag-shaped section including a first sheet member formed with a central opening through which gas is supplied into the bag-shaped section from the gas generator, and a second sheet member joined with said first sheet member at an outer peripheral portion to define a gas chamber which is to be filled with the gas from the gas generator;
      a plurality of suspension belts disposed inside said bag-shaped section to connect said first and second sheet members at their inner surfaces;
      a belt catch member to which one end section of each suspension belt is sewed, said belt catch member being disposed inside said bag-shaped section;
      means defining a sewed section through which said belt catch member is sewed to one of said first and second sheet members at the inner surface, said sewed section extending linearly and including a straightly extending portion which is generally perpendicular to a lengthwise direction of each suspension belt.

2. An airbag restraint system as claimed in claim 1, said straightly extending portion has a length larger than a width of the end section of said suspension belt.

3. An airbag restraint system as claimed in claim 1, wherein said straightly extending portion of said sewed section is generally perpendicular to a plane containing a longitudinal axis of the end section of said suspension belt.

4. An airbag restraint system as claimed in claim 1, wherein said straightly extending portion of said sewed section is generally perpendicular to a lengthwise direction of the end section of each suspension belt.

5. An airbag restraint system as claimed in claim 1, wherein said straightly extending portion of said sewed section is generally perpendicular to a plane containing a longitudinal axis of the end section of each suspension belt.

6. An airbag restraint system as claimed in claim 1, wherein the one end section of said suspension belt is sewed through said sewed section to said first sheet member.

7. An airbag restraint system as claimed in claim 6, wherein said first sheet member is generally annular, and said second sheet member is generally circular, in which said first and second sheet members are sewed at their peripheral portions with each other to form said bag-shaped section.

8. An airbag restraint system as claimed in claim 7, further comprising a base member to be fixed to a stationary member of a vehicle, in which and inner peripheral portion of said second sheet member is secured to said base member.

9. An airbag restraint system as claimed in claim 8, wherein said gas generator has a gas ejection opening to eject gas so that the gas strikes against the inner surface of said second sheet member.

10. An airbag restraint system as claimed in claim 1, wherein said straightly extending portion of said sewed section is smaller in sewing pitch than remaining portions of said sewed section.

* * * * *